United States Patent [19]

Rippel et al.

[11] 4,319,318
[45] Mar. 9, 1982

[54] VOLTAGE REAPPLICATION RATE CONTROL FOR COMMUTATION OF THYRISTORS

[75] Inventors: Wally E. Rippel, Altadena; Dean B. Edwards, Monrovia, both of Calif.

[73] Assignee: California Institute of Technology, Pasadena, Calif.

[21] Appl. No.: 187,620

[22] Filed: Sep. 15, 1980

[51] Int. Cl.³ .................... H02M 7/515; H03K 17/73
[52] U.S. Cl. ............................... 363/138; 307/252 B; 307/252 M; 363/57; 363/58
[58] Field of Search .................. 363/57, 58, 137, 138; 307/252 B, 252 M, 252 J

[56] References Cited

U.S. PATENT DOCUMENTS

| | | | |
|---|---|---|---|
| 3,694,670 | 9/1972 | Marzolf | 307/252 M |
| 3,872,364 | 3/1975 | Hubner | 363/37 |
| 3,928,775 | 12/1975 | Steigerwald | 307/252 M |
| 4,107,551 | 8/1978 | Akamatsu | 307/252 M |

FOREIGN PATENT DOCUMENTS 54-99933  8/1979  Japan ..................................... 363/58

OTHER PUBLICATIONS

SCR Manual, Fifth Edition, G.E. Co., 1977, pp. 63–67, 133 & 139–141.

German Publication "Elektrische Bahnen", 77 (1979), H. 11, by Bohm & Kruger, pp. 306–312.

Primary Examiner—William H. Beha, Jr.
Attorney, Agent, or Firm—Freilich, Hornbaker, Wasserman, Rosen & Fernandez

[57] ABSTRACT

A circuit for commutating a thyristor (21) by shunting its current for a minimum interval, thereby removing sustaining voltage to said thyristor, then subsequently restoring voltage to said thyristor at a predetermined rate, utilizes a series combination of a commutation electronic switch (22) and an isolated dc voltage supply (23) connected in parallel with the thyristor. The voltage supply is arranged with a polarity that permits the current flowing through the thyristor in one direction to be bypassed through the series combination while the commutation switch is turned on and to reverse bias the thyristor when the commutation switch is fully on. A dv/dt control circuit (24) limits the rate of rise of voltage across the commutation switch (22) as it is turned off in response to a command input signal. The dv/dt control circuit is comprised of a constant current drive (31) and a capacitor (32) connected between the output terminal of the commutation switch and the control input terminal of the commutation switch. The thyristor may be a triac (40) with two commutation switches (42, 43), one for current of each polarity, or with a single commutation switch (55) and a bridge circuit (52–55) for selecting the polarity of the switch (56).

16 Claims, 13 Drawing Figures

VOLTAGE REAPPLICATION RATE CONTROL FOR COMMUTATION OF THYRISTORS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; USC 2457).

TECHNICAL FIELD

This invention relates to electronic power switching techniques using transistor commutated thyristors wherein commutation and control of voltage reapplication rates are each inherently provided.

BACKGROUND ART

As used herein, the term thyristor refers generically to devices of the four-layer (pnpn) type having three terminals (anode, cathode and gate), and of the five-layer (npnpn) type having three terminals (two anodes and gate). The five-layer type is commonly referred to in the literature as a triac, while the four-layer type is referred to as a silicon controlled rectifier (SCR). These devices are two-state components which operate either in a high-impedance off state or a low-impedance on state; switching from the off to the on state is achieved by the application of a suitable current pulse to the gate.

Both types of devices suffer in that switching from on to off requires first an interruption of the anode current for an interval which exceeds a minimum time span ($t_q$) followed by a reapplication of anode voltage which does not exceed a critical rate of rise (dv/dt). If either the $t_q$ or the dv/dt condition is not met, switching to the off state may fail to occur.

While thyristor devices suffer the above problems associated with turn-off, they are nevertheless attractive in terms of cost, reliability and ruggedness.

In certain applications where the input power is ac, such as phase-controlled bridges and light dimmers, the thyristors turn-off characteristics are not problematic because turn-off is inherently provided by the reversals in the input line voltage which occur each half cycle. However, in most other applications where the input power is dc, such as inverters and choppers, additional circuitry must be used to provide commutation. Examples of such external commutation circuitry range from schemes involving capacitors, inductors, diodes and commutating SCR's to circuits using transistors and commutating power supplies. Typically, the cost, weight and power losses associated with these commutating components are dominant over the cost, weight and losses directly associated with the thyristors themselves. It is for this reason that bijunction transistors have supplanted thyristors in many inverter and chopper applications where high current rating is not required for switches.

OBJECTS AND SUMMARY OF THE INVENTION

An object of this invention is to provide a means for commutating thyristors wherein the anode current is shunted for a minimum interval ($t_q$) and the subsequent restoration of anode voltage is controlled to be below a critical rate of rise (dv/dt).

Another object is to provide a circuit for forced commutation of a plurality of thyristors used for inverters, converters, choppers and the like, wherever commutated thyristors are required.

These and other objects of the invention are achieved by a commutation means for a thyristor comprised of a series combination of an isolated dc voltage supply (commutating supply) and a commutating electronic switch (preferably a field-effect transistor) connected in parallel with the thyristor. The polarity of the commutating supply is such that when the commutating switch is fully on, load current is bypassed through the series supply-switch combination, and the thyristor is reverse biased. The commutating switch is controlled by means for limiting the rate of rise of voltage across the commutating switch as it is turned off. In this way, the rate of voltage rise to the thyristor under commutation is also maintained to within the critical limits.

The thyristor is turned on in the conventional manner by application of a suitable current pulse to its gate. When it is desired to turn off the thyristor, the commutating switch is first turned on and held on for a time span greater than the minimum turn-off time ($t_q$). During this time interval, current ceases to flow through the thyristor and "charge carrier recombination" occurs within the thyristor, thus enabling recovery to the off state. After this interval (typically 10 to 50 $\mu$sec), the commutating switch is turned off at a controlled rate by action of the limiting means. When current through the commutating switch reaches zero, the commutation cycle is complete. This thyristor commutating technique may be extended to include sequential commutation of a multiplicity of thyristors using one commutating supply and one commutating switch.

The means for limiting the rate of rise of voltage across the commutating switch is comprised of a capacitor connected between the output terminal of the switch and its control input, and means connected to a junction between the capacitor and switch control terminal for generating a constant current in response to a command input signal. For turning on the switch the current generated is of one polarity, and for turning off the switch the current generated is of opposite polarity, whereby the rate of change of conduction, and therefore voltage, of said switch is controlled for both turn on and turn off.

The novel features of this invention are set forth with particularity in the appended claims. The invention will best be understood from the following description when read in connection with the accompanying drawings.

Reference will now be made in detail to preferred embodiments of the invention, exemplars of which are illustrated in the accompanying drawings.

DESCRIPTION OF PREFERRED EMBODIMENTS

To better understand the problem and its solution by this invention, a representative prior-art solution to the problem will first be described with reference to FIG. 1 which shows a silicon-controlled rectifier (SCR) 10 connected with a gate drive circuit 11 and a bijunction transistor commutation switch 12. Prior to the application of a positive current gate pulse, the SCR is assumed to be in the off state and current flow between two nodes A and B is limited to the SCR leakage current. Upon application of a current pulse to the gate, the SCR switches to the on state and current flow from A to B is limited only by an external circuit that includes a power source.

The SCR is typically turned off by momentarily turning on the bijunction transistor switch 12 which effectively places commutation power supply 13 in parallel with the SCR, directs load current away from the SCR, and back biases the SCR. If current is diverted through transistor 12 for an interval which exceeds the SCR turn-off time ($t_q$), the SCR will revert to the off state when the transistor switch 12 is turned off, providing that the voltage reapplication rate (dv/dt) to the anode of the SCR does not exceed a critical limit of the SCR. In order to assure that the applied dv/dt does not exceed the rated dv/dt of the particular SCR, capacitor $C_s$ must have a value greater than $I_{max}/(dv/dt)$ rating, where $I_{max}$ is the maximum current to be commutated and dv/dt is the manufacturer's rating of the SCR. Diode $D_s$ directs the load current through the capacitor $C_s$ during turn off, and resistor $R_s$ discharges the capacitor $C_s$ to near zero voltage during the on interval of the SCR. The combination $C_s$, $D_s$ and $R_s$ in the circuit enclosed by a dotted line 16 is referred to as a "snubber."

Figure 2:
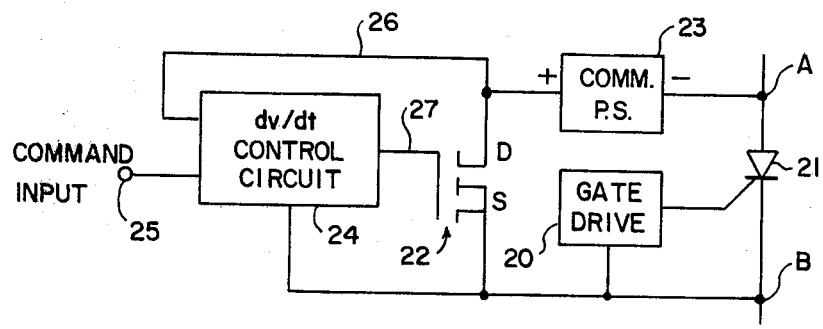
FIG. 2 is a circuit diagram of the present invention which combines the switch and snubber functions in one FET switch and its controlled current drive circuit to turn off an SCR.

Referring now to FIG. 2, an SCR gate drive circuit 20 is provided in the usual manner to inject a current pulse into the gate of an SCR 21 to turn it on. An FET switch 22 is connected in parallel with the SCR through a commutating power supply 23 which functions as an isolated voltage source. The FET is driven by a control circuit 24. In response to an "on voltage" applied to a command input 25, the control circuit drives the FET on, but limits the rate of change in the drain-to-source voltage to a fixed value. After a given time interval, an "off voltage" may be applied to control circuit 24 which turns off the FET, but with a rate of voltage change ("slew" rate) that is less than the rated dv/dt of the SCR.

Figure 1:
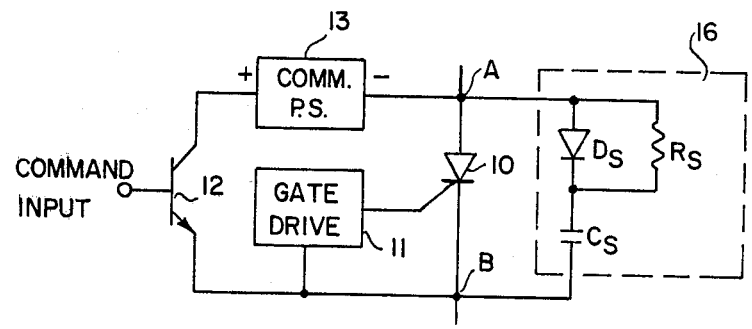
FIG. 1 is a circuit diagram of a prior art switch and "snubber" for turning on and turning off an SCR.

It is thus evident that the controlled FET switch replaces both the bijunction transistor and snubber of FIG. 1. While a bijunction transistor could conceptually be used in this controlled slew mode, resulting second breakdown effects would cause such devices to suffer internal destruction. By contrast, FET's which are essentially free from second breakdown may be operated in this mode without damage. However, since further development of the technology of bijunction transistors may overcome this problem, and still other types of semiconductor switches may be developed for use in this controlled slew mode, it should be understood that FET switches are shown only by way of example, and not by way of limitation. The important part of the combination is the control circuit for the switch which samples the voltage at the output of the switch (i.e., the drain of an FET or the collector of a bijunction transistor) and turns off the switch at a controlled voltage rate. It also controls the output voltage when the switch is turned on, but it is the turn-off rate that is important.

The control circuit 24 is comprised of a servo means for sensing the output voltage of the switch 22 over a line 26, and so controlling operation of the switch 22 over a line 27 as to maintain the slew rate below the rated dv/dt of the SCR, both while turning the switch 22 on and, more importantly, while turning the switch 22 off to maintain reapplication of anode voltage to the SCR below its rated dv/dt. The combination of the switch 22 and control circuit 24 thus serves the purpose of the prior art transistor switch 12 and snubber 16. It is in this sense that the controlled switch 22 is said to replace the bijunction transistor and snubber of the prior art. The present invention thus does away with the prior art snubber.

It will be noted that by using a linearly controlled switch, constant dv/dt values are dynamically achieved independent of the load current. Accordingly, under reduced load conditions, the losses associated with finite dv/dt are proportionately reduced. By contrast, the prior-art (resistor-capacitor-diode) snubber produces dv/dt values which vary reciprocally with the load current and losses which are independent of the load. Although the switch and control circuit will have losses which are equivalent to losses of the snubber at full load, the losses are proportionately less at reduced current loads with this controlled slew mode of commutating an SCR.

The technique applies to virtually all cases in which electric currents are switched on and off by electronic means. The following is a partial listing of such cases which will be described along with the preferred embodiments of the invention as applied to the individual cases:

1. Single Unidirectional Switch

These topologies enable turn on and turn off of single branch unidirectional currents. The preferred embodiment consists of a single SCR which has connected in parallel with it a series combination of commutating supply and switch. Specific examples include buck regulators, boost regulators and flyback regulators as well as simple dc switching and circuit breaker applications.

2. Single Bidirectional Switch

These topologies enable turn on and turn off of single branch bidirectional currents. Two preferred embodiments are included. The first consists of a single triac which is paralleled by two branches, each consisting of an isolated voltage supply, a commutating switch and a diode. The polarities of the branch components are such that one branch commutates "forward" triac currents, and the other branch commutates "reverse" triac currents. In the second, a series combination consisting of one voltage supply and one commutating switch is connected to a "polarity reversing" SCR bridge, the output of which shunts the triac. With one pair of bridge SCR's fired on, the supply-switch combination commutates "forward" triac currents and with the complimentary pair of bridge SCR's fired on, "reverse" currents are commutated. Specific examples for both embodiments include ac switches, ac circuit breakers and ac equivalents of the buck, boost and flyback regulators.

3. Multiunidirectional Switches Having One Buss in Common

These topologies enable individual turn on and turn off of multibranch unidirectional currents which flow toward (or away from) a common node. The preferred embodiment consists of N main SCR's having common anodes (or cathodes), a series combination of one voltage supply and one commutating switch and N commutating SCR's which selectively connect the supply-switch combination across one of the N main SCR's. Specific examples include multiphase regulators of the buck, boost and flyback tapes and half-wave multiphase inverters. (Two such circuits may be used for a full-wave multiphase bridge inverter.)

4. Multibidirectional Switches Having One Buss in Common

These topologies enable individual turn on and turn off of multibranch bidirectional currents which flow toward or away from a common node. Two preferred embodiments are illustrated. The topology of the first embodiment resembles the previously described Multi-unidirectional Switch topology except that triacs replace the main SCR's and two complementary commutation circuits are used (one for "forward" and the other for "reverse" currents), each consisting of one supply, one switch and N SCR's. Specific examples include multiphase ac regulators and single-phase ac to polyphase ac bidirectional frequency changers.

5. Multiunidirectional Switches used in Generalized Switch Matrix

These topologies enable individual turn on and turn off of multibranch unidirectional currents which flow toward (and/or away from) a multiplicity of common nodes. The preferred embodiment consists of N main SCR's with anodes connecting to j distinct nodes and cathodes connecting to k distinct nodes (where both j and k may range between 2 and N) and j+k commutating SCR's which selectively connect the supply-switch series combinations across one of the N main SCR's. Specific examples include multiphase, multichannel regulators and multistep, multiphase half wave and full wave inverters.

6. Multibidirectional Switches used in Generalized Switch Matrix

These topologies enable individual turn on and turn off of multibranch bidirectional currents which flow toward (and/or away from) a multiplicity of common nodes. The preferred embodiment consists of N main triacs with number one anodes connecting to j distinct nodes and number two anodes connecting to k distinct nodes (where both j and k may range between 2 and N) and j+k commutating triacs which selectively connect the supply-switch and SCR bridge series combination across one of the main triacs for bidirectional commutation. Specific examples include the most generalized form of ac control wherein bidirectional energy flow between systems of differing numbers of phases may be controlled while allowing independent control of frequency, power factor and voltage levels.

Figure 3:
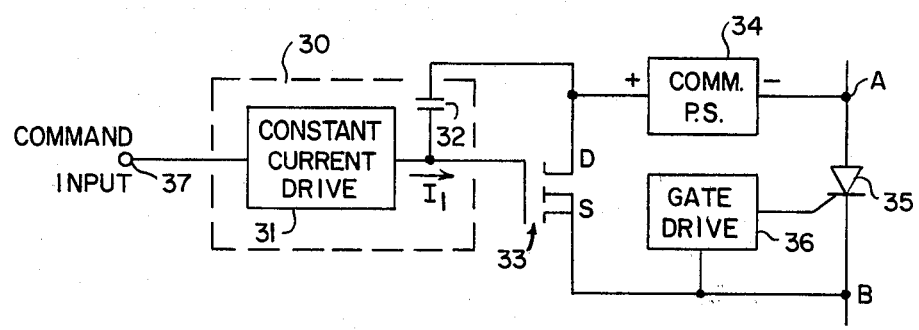
FIG. 3 illustrates the circuit of FIG. 2 with an exemplary implementation of the controlled current drive circuit using a constant current drive circuit.

A preferred servo means by which the FET drive is implemented is shown in FIG. 3 enclosed by a dotted line 30. The servo means is comprised of a constant current drive circuit 31 and a capacitor 32 connected between the gate and drain of FET switch 33. The FET switch is connected in series with a commutating power supply 34, and the series circuit is connected in parallel with an SCR 35. An SCR driver 36 is used to turn the SCR on in the usual way. When the SCR is to be turned off, a pulsed signal is applied to the current drive circuit at a command input terminal 37. This in turn causes a constant current $I_1$ to be delivered by the current drive circuit to the gate-capacitor node. If capacitor 32 is sufficiently large (e.g., ten times the internal FET capacitance), most of the drive circuit current will be delivered to the capacitor. Next, if the effective voltage gain of the FET is high compared to unity (which is essential), then the drain voltage will have a slew rate of fall given by $-I_1/C$, where C is the capacitance of the capacitor 32. The drain-to-source voltage continues falling at this rate until saturation of the FET is reached, at which time the current into capacitor 32 can no longer be maintained at $I_1$ and the current drive circuit saturates, thus reaching a maximum gate voltage. The FET is thus driven from off to full on at a controlled rate. The connection of the FET drain to the capacitor corresponds to the line 26 of FIG. 2 to provide feedback sensing of the drain voltage to the capacitor 32 for a controlled rate of change of gate voltage, thereby providing servo control of the rate at which the FET is turned on.

After a time interval of $t_q$, the input command signal to the current drive circuit may be removed. This in turn causes the current drive circuit to output a negative current $(-I_2)$ which, in line with the previous arguments, causes the FET to turn off with drain to source slew rate of $I_2/C$. This slew rate continues until the drain current essentially reaches zero, at which time the current drive circuit saturates, thus reaching a maximum negative output voltage. At this point, the commutation cycle is complete.

Figure 4:
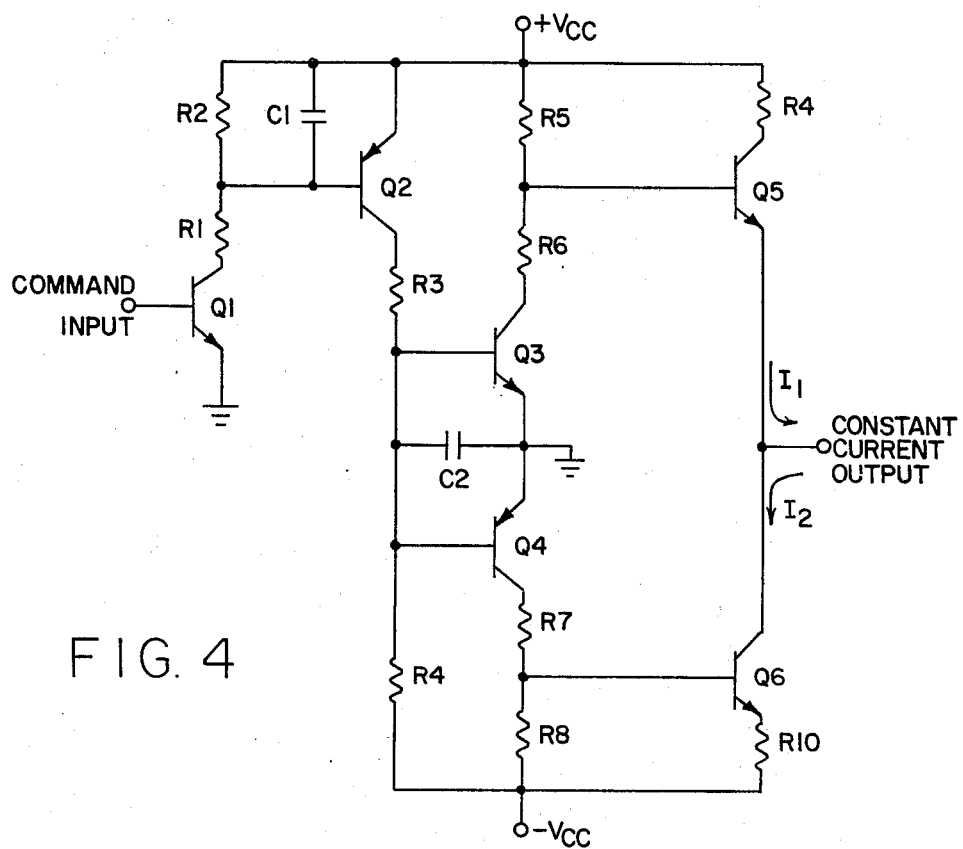
FIG. 4 is a diagram for the constant current drive circuit of FIG. 3.

One embodiment for the current drive circuit 31 is shown in FIG. 4. In the absence of a command input signal, transistors Q1, Q2 and Q3 are off. This allows transistor Q4 to be held on via current through resistor R4. With transistor Q4 on, a fixed voltage is established at the junction of resistors R7 and R8 which in turn causes transistor Q6 to sink a constant current $(-I_2)$.

Transistor Q1 (which may be either a conventional bijunction transistor or part of an optical coupler) saturates in response to an input signal and thereby causes the junction between resistors R1 and R2 to drop, which in turn causes transistor Q2 to saturate. Current through resistor R3 turns resistor Q3 on to saturation and transistor Q4 off. With transistor Q3 on, transistor Q5 is caused to source a constant current ($I_1$). Capacitors C1 and C2 are for added noise immunity while resistors R2, R5 and R8 bypass leakage currents.

Figure 5:
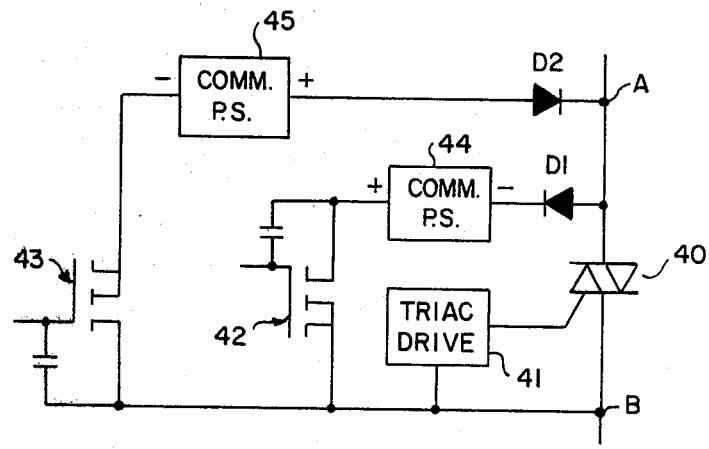
FIG. 5 illustrates the present invention applied to a single bidirectional switch in one embodiment.

FIG. 5 illustrates an application of the basic invention described with reference to FIGS. 2 and 3 to the commutation of a triac 40 wherein bidirectional currents may be turned on and off between nodes A and B. The triac is turned on in the conventional way using a current pulse generated by a driver 41 and applied to the triac gate.

Since a triac is equivalent to two SCR's connected in antiparallel with a common gate electrode, it can provide switching action for current between nodes A and B of either polarity in response to a current pulse applied to its single gate electrode. The polarity of the current will depend only upon the polarity of the voltage applied to nodes A and B.

For commutation of forward currents (A to B), an appropriate drive signal is applied to an FET switch 42 and for reverse currents (B to A), an appropriate drive signal is applied to an FET switch 43. Diodes D1 and D2 assure that commutating currents through the FET switches 42 and 43, and their respective commutating power supplies 44 and 45, are of the proper polarity, and that only one FET switch conducts. In this circuit diagram, and subsequent circuit diagrams, the FET gate drive circuit is not shown for simplicity; in each case, the gate drive circuit described with reference to FIGS. 2, 3 and 4 is applicable.

Figure 6:
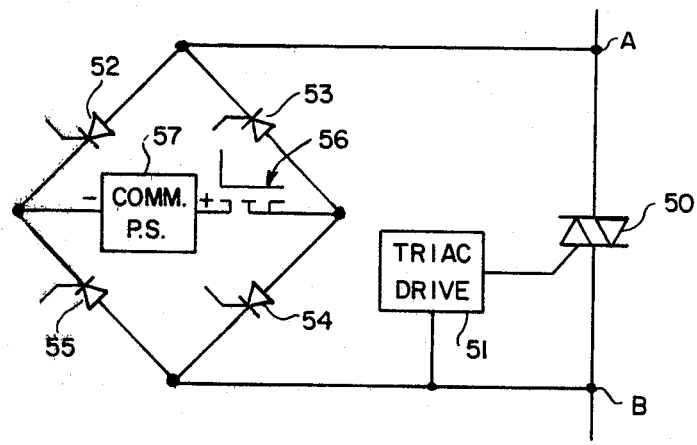
FIG. 6 illustrates the present invention applied to a single bidirectional switch in a second embodiment.

FIG. 6 illustrates a variation of the bidirectional circuit shown in FIG. 5. Again a triac 50 is turned on by a current pulse applied to its single gate electrode by a drive circuit 51. For commutation of forward currents (A to B) through the triac, SCRs 52 and 54 are turned on in conjunction with an FET switch 56 in series with a commutating power supply 57. For reverse current commutation, SCRs 53 and 55 are turned on in conjunction with the FET switch 56.

Figure 7:
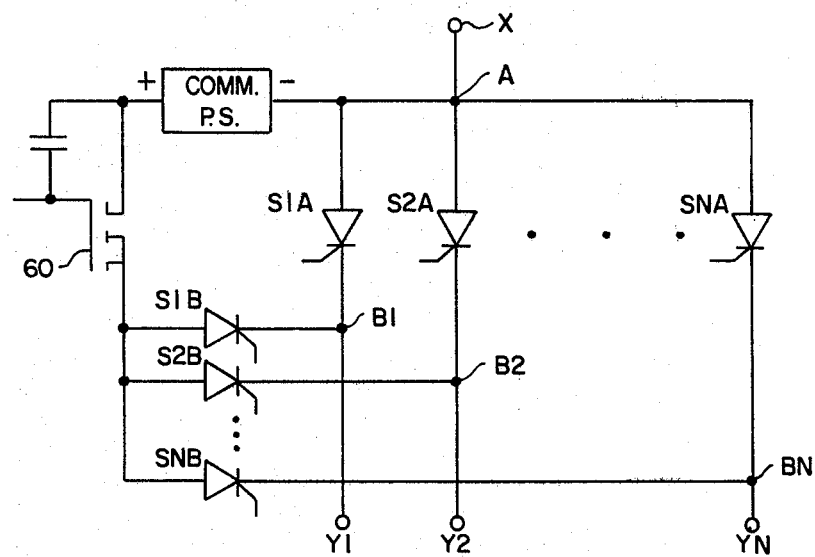
FIG. 7 illustrates the present invention applied to a multiplicity of unidirectional switches which share common nodes useful for such exemplary applications as polyphase buck, boost and flyback switching regulators as well as half-wave and full-wave polyphase inverters.

FIG. 7 illustrates an application of the basic circuits of FIGS. 2 and 3 to the commutation a multiplicity of SCR's S1A through SNA having common anodes (or cathodes) at a node A using commutation SCR switches S1B through SNB connected to respective nodes B1 through BN. When commutation of a particular main SCR switch SiA is desired, the corresponding commutation SCR switch SiB is turned on, and a drive signal is applied to an FET switch 60. The result is controlled switching of unidirectional current from an input terminal X to selected outputs terminals Y1, Y2 . . . YN.

Figure 8:
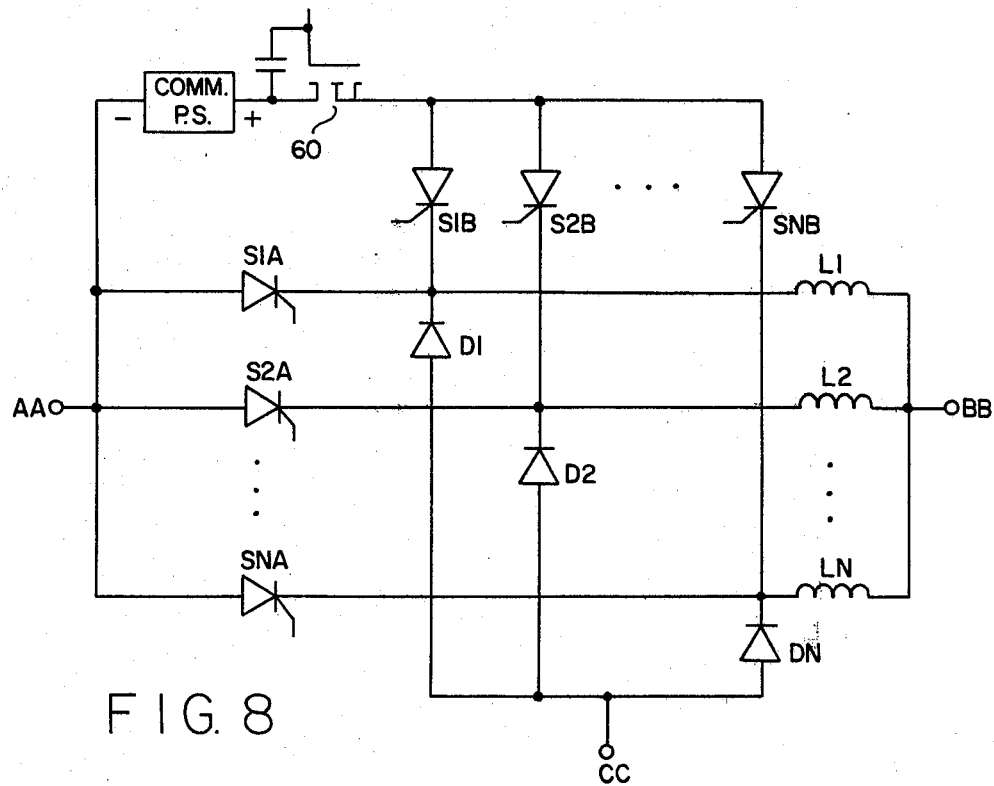
FIG. 8 illustrates an application of the circuit of FIG. 7 to polyphase switching regulators; when node AA is common to input and output, boost mode operation results; when node BB is common, flyback mode operation results; and when node CC is common, buck mode operation results.

FIG. 8 illustrates an application of the circuit to a conventional polyphase switching regulator, where inductors L1 through LN are the inductances, D1 through DN are the commutating (freewheeling) diodes, and SCR switches S1A through SNA are the N-phase chopper switches. When commutation of a particular chopper switch SiA is desired, the corresponding commutation switch SiB is fired, and a drive signal is applied to FET switch 60. Depending on whether terminal AA, BB or CC is common to both input and output, the circuit may function as a boost, buck-boost or buck chopper.

Figure 9:
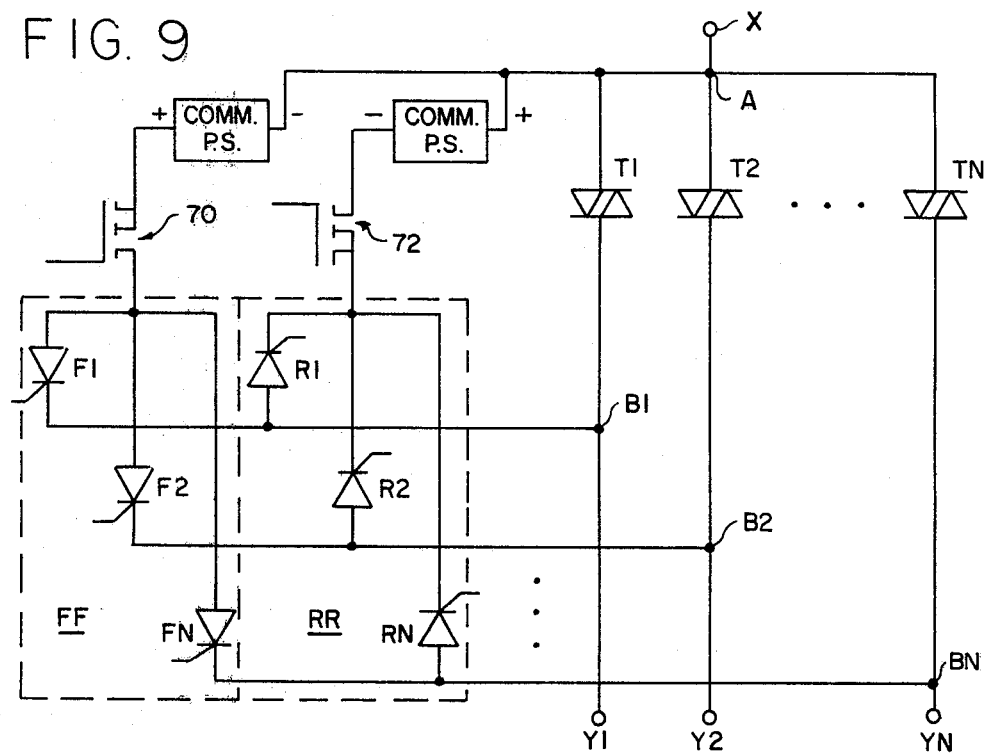
FIG. 9 illustrates an application of the present invention to a multiplicity of bidirectional switches which share a common node.

FIG. 9 illustrates an application of the basic circuit of FIGS. 2 and 3 to the commutation of a multiplicity of triacs T1 through TN having a common node A at one of their terminals and separate nodes B1 through BN at their other terminal. For commutation of forward currents, such as A to B1, an SCR F1 from one group FF is fired and an appropriate drive signal is applied to FET switch 70. For commutation of reverse currents, such as B1 to A, an SCR R1 from another group RR is fired and an appropriate drive signal is applied to FET switch 72.

Figure 10:
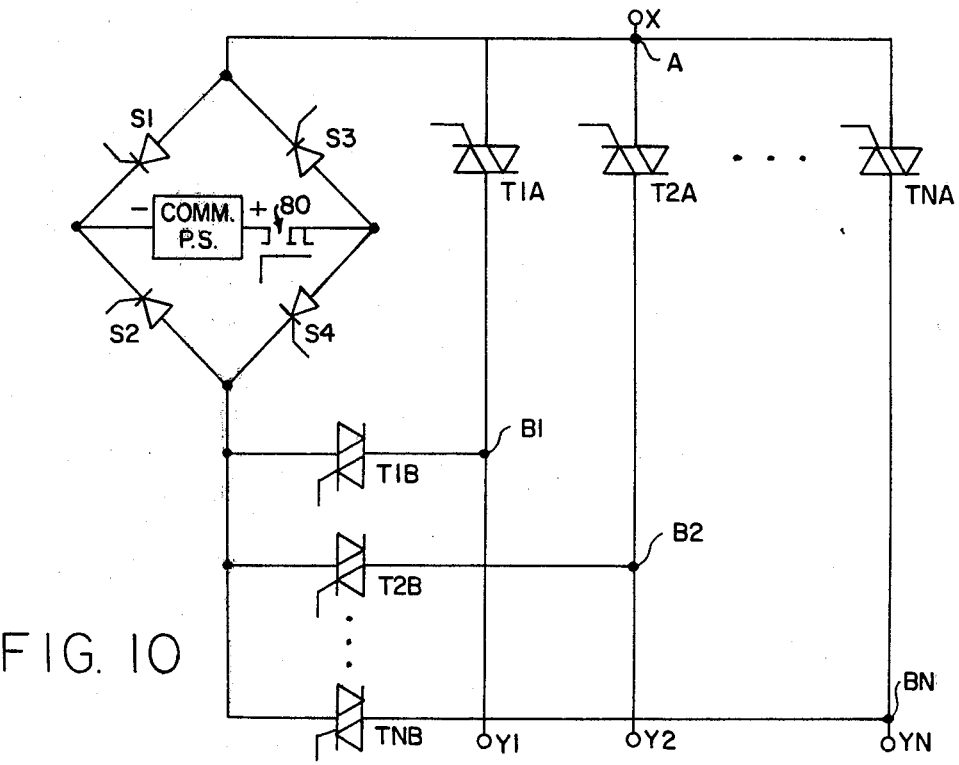
FIG. 10 is a variation of the circuit of FIG. 9. The circuits of FIGS. 9 and 10 apply to polyphase "ac switching regulators."

FIG. 10 is a variation of the circuit of FIG. 9 employing the basic circuit of FIG. 6 with a second group of triacs T1B through TNB, but instead of two commutation switches, only one FET switch 80 is used with four SCR switches S1-S4. Forward currents such as A to B1 are commutated by firing SCR's S1 and S4, and triac T1B, while applying the appropriate drive to FET switch 80. Reverse currents are commutated by firing SCR's S2 and S3, and the appropriate tric, while driving FET switch 80.

Figure 11:
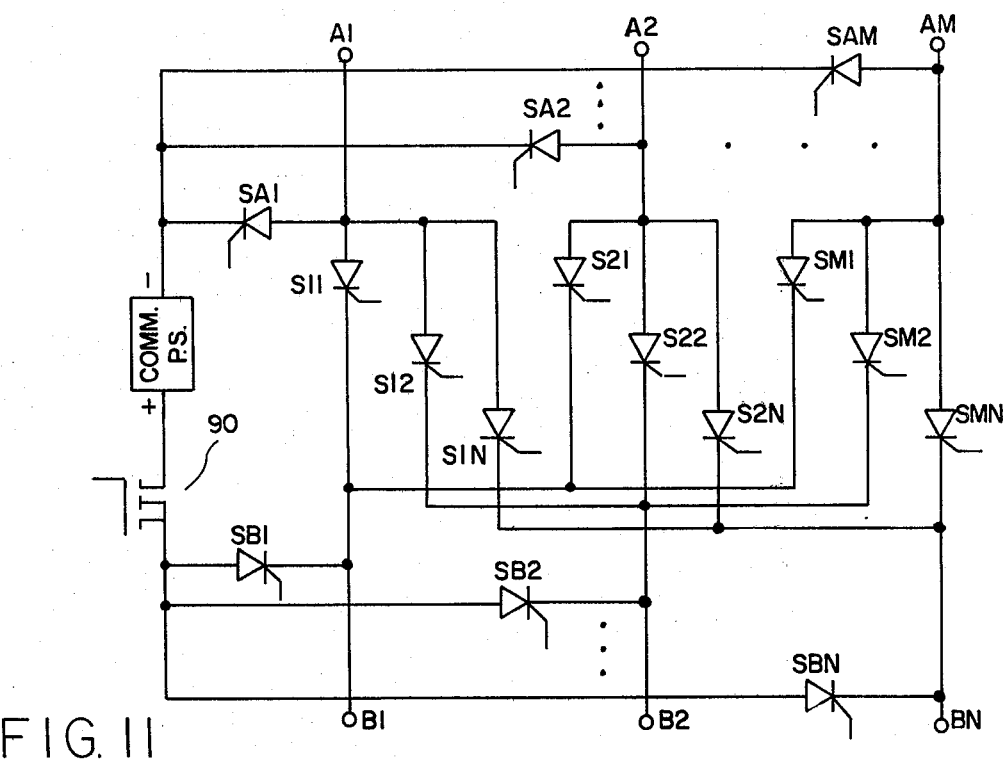
FIG. 11 illustrates the present invention applied to a multiplicity of unidirectional switches which form a generalized switching matrix.

FIG. 11 illustrates an application of the basic circuit of FIGS. 2 and 3 to the commutation of a multiplicity of SCR's S11 through SMN connected in a generalized switching matrix with switches SA1-SAM and SB1-SBN coupling an FET switch 90 and power supply 91 between selected input and output terminals A1-AM and B1-BN. In that manner, a total of $M \times N$ main SCR's provide all possible current paths between M input terminals and N output terminals. To commutate the SCR which connects between the input terminal Ai and the output terminal Bj, SCRs SAi and SBj are fired and an appropriate drive signal is applied to FET switch 90.

Figure 12:
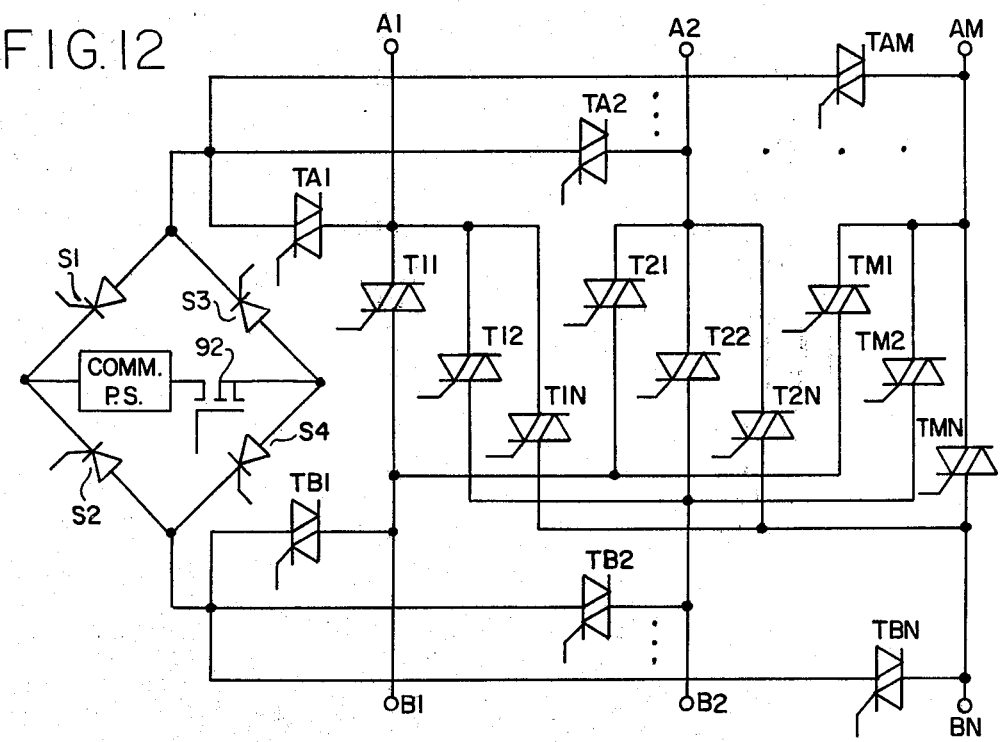
FIG. 12 illustrates an application of the present invention to a multiplicity of bidirectional switches which form a generalized switching matrix.

FIG. 12 illustrates an application of the basic circuit of FIGS. 2 and 3 to the commutation of a multiplicity of triacs connected in a generalized switching matrix. In the general case, a total of $M \times N$ main triacs provide all possible bidirectional current paths between M terminals A1-AM and N terminals B1-BN. In order to commutate "forward" current, the triac which connects between the $i^{th}$ input and the $j^{th}$ output terminal, triacs TAi and TBj and SCR's S1 and S4 are fired and an appropriate signal is applied to an FET switch 92. Reverse currents are commutated similarly except that SCR's S1 and S3 are fired in place of S1 and S4.

Figure 13:
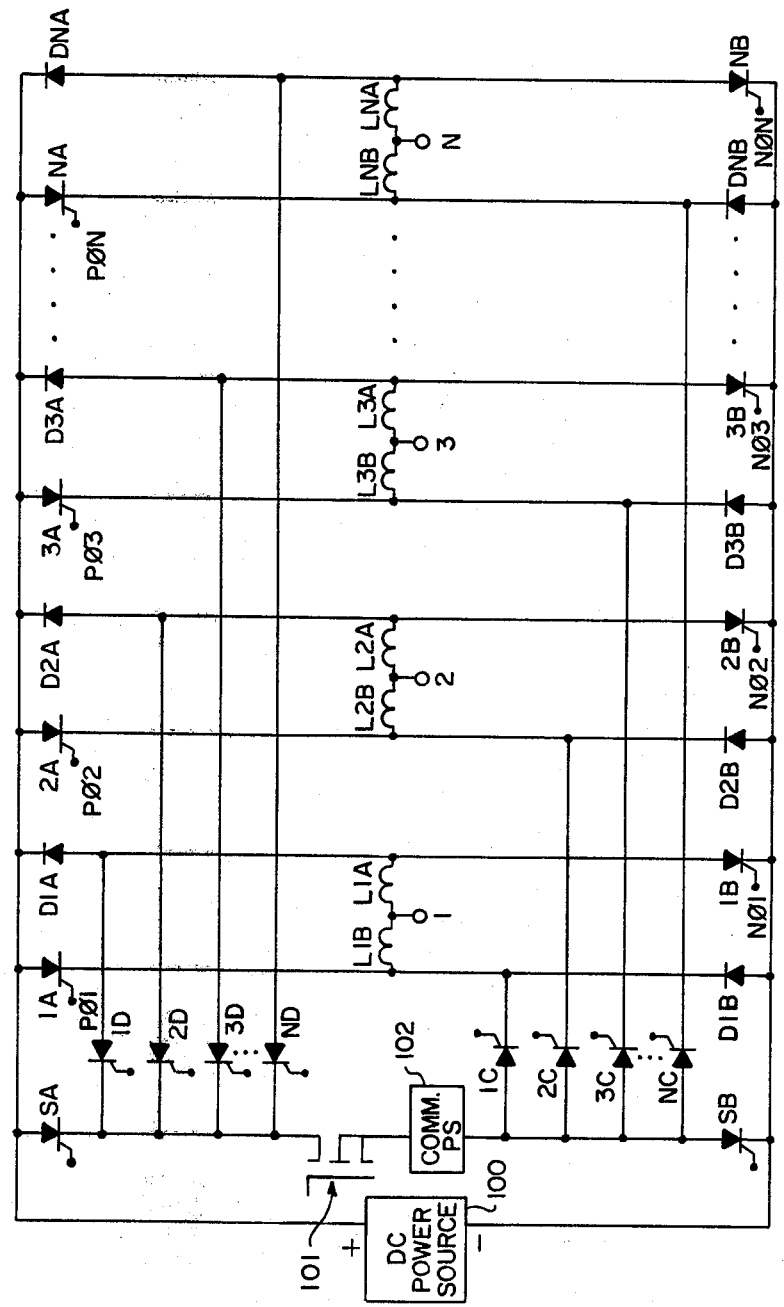
FIG. 13 illustrates application to a polyphase bridge inverter various techniques for practicing the invention illustrated in FIGS. 8 and 11.

FIG. 13 illustrates the manner in which the various techniques described with reference to FIGS. 2 through 12 may be utilized in a particular application. The illustrative example chosen is a polyphase bridge inverter utilizing SCR switches as described with reference to FIGS. 3 and 7 in a switching matrix as described with reference to FIG. 11. Triac switches as described with reference to FIGS. 5, 6, 9, 10 and 13 could be similarly combined in a particular application to take advantage of the bidirectional current capability of the triacs.

Referring now to FIG. 13, it may be readily appreciated that a specialized switching matrix is provided to alternately connect positive and negative terminals of a dc power source 100 to a plurality of output terminals 1 through N in a phase relationship controlled by the times that SCR switches are turned on and off in one main group of SCRs 1A through 1N and another main group of SCRs 1B through NB by control signals P$\phi$1 through P$\phi$N and N$\phi$1 through N$\phi$N generated in a control circuit not shown. Each group of SCRs is used in a switching matrix similar to that shown in FIG. 8, except that inductors L1A-LNA and L1B-LNB associated with switches 1A-1N and 1B-NB are not connected to a common terminal. Instead the corresponding inductors of the two main groups of SCR switches are connected together at terminals 1 through N. Considered from a different point of view, the circuit of FIG. 13 is like the switching matrix of FIG. 11 where, for each main group of switching SCRs, there is one input terminal (positive or negative terminal of the power supply) and a plurality of output terminals (1-N) corresponding to, for example, an input terminal A1 and output terminals B1-BN in FIG. 11.

In order that a single commutation switch 101 and power supply 102 be time shared for commutating the two main groups of SCRs, two additional steering SCR switches SA and SB are provided with the steering SCR switches 1C-NC and 1D-ND to be used with the respective SCR switches of the main groups 1A-NA and 1B-NB. Although two circuits like that of FIG. 8 are combined with steering switches SA and SB for time sharing a single commutating switch and power supply, it would, of course, be possible to utilize a separate commutating switch and power supply for each main group of SCR switches.

In operation, a select SCR is turned on to connect a positive or negative terminal of the dc power supply to a particular terminal 1 through N, such as SCR switch 1A. Current then flows through inductance L1B. To commutate the SCR switch 1A, steering switches SA and 1C are turned on as well as the commutation switch 101 to shunt current from the switch 1A. Similarly, to commutate the SCR switch 1B, the steering switches 1D and SB are turned on with the commutation switch 101 to shunt current from the switch 1B. Steering circuits SA and SB thus determine whether a positive or negative terminal SCR is to be commutated, and the groups of steering circuits 1C-NC and 1D-ND determine which one.

In order to handle regenerative and reactive currents, the main SCRs 1A-NA and 1B-NB are paralleled by respective diodes D1A-DNA and D2B-DNB. To allow reverse biasing of the SCRs during commutation, and to prevent excessive commutation currents from flowing through the antiparallel diodes, inductors L1A-LNA ad L1B-LNB are connected as shown. These inductors, which are preferably of the saturating type, have the added advantage of reducing di/dt during SCR turn on.

The circuit of FIG. 13 may be operated in a modulating mode where the phase to phase half cycle average voltage is reduced below the input supply voltage by chopping action. Furthermore, the specific on and off times associated with this chopping may be selected such that system or component harmonic losses are minimized. Phase rotation, frequency, and phase are also variables which may be controlled. In addition to the above features, the circuit, when compared with the state of the prior art, allows for reducing weight and cost, and for improved efficiency. Because of these features, the circuit is ideally suited for polyphase ac motors.

It is thus evident that in many different applications, wherein one or more thyristors are to be commutated by shunting its anode current with a controlled slew rate, a series combination of a commutation electronic switch and an isolated dc voltage supply may be arranged to shunt the anode current with a controlled slew rate in response to a command input signal, where the slew rate is controlled by servo means connected between a control terminal of the switch and a point on the series combination selected for sensing voltage across the switch. Whereas the slew rate in turning a commutation electronic switch off is important in virtually all applications, in some applications using a multiplicity of main current carrying thyristors (such as in the inverter of FIG. 13) it is also important to control the rate at which a commutation electronic switch is turned on. Otherwise, the rate of change of voltage across the commutation switch being turned on may exceed the dv/dt capability of one or more of the thyristors in the circuit. While specific examples have been given, it is recognized that modifications and variations may readily occur to those skilled in the art. Consequently it is intended that the claims be interpreted to cover such modifications and variations.

What is claimed is:

1. A circuit for commutating a thyristor by shunting its current for a minimum interval, thereby removing sustaining current to said thyristor, then subsequently restoring voltage to said thyristor at a predetermined rate, comprising a series combination of a commutation electronic switch and an isolated dc voltage supply connected in parallel with said thyristor, said commutation switch having a control input terminal, and said isolated dc voltage supply being arranged with a polarity that permits thyristor current flowing in one direction to be bypassed through said series combination while said commutation switch is turned on in response to a command input signal, and permits reverse biasing said thyristor when said commutation electronic switch is fully on, and servo means for limiting the rate of rise of voltage across said commutation switch as said switch is turned off in response to said command input signal applied to said servo means, said servo means being connected to receive said command input signal, and connected to a sensing point on said series combination for sensing voltage across said commutation switch.

2. A circuit as defined in claim 1 wherein said servo limiting means is comprised of circuit means for generating a constant current to said control input terminal of said commutation switch in response to said command input signal, and a capacitor connected between said control input terminal of said commutation switch and said voltage sensing point, whereby the rate of change of voltage across said commutation switch is controlled by the rate of change of the charge in said capacitor.

3. A circuit as defined in claim 2 wherein said constant current generating means produces current of one polarity to turn on said commutation switch, and of opposite polarity to turn off said commutation switch, whereby the rate of change of voltage of said commutation switch is controlled for both turning on and turning off said commutation switch.

4. A circuit as defined in claim 1, 2 or 3 wherein said electronic commutation switch is comprised of a field effect transistor.

5. A circuit as defined in claim 4 wherein said thyristor is selected to be a silicon controlled rectifier.

6. A circuit as defined in claim 4 wherein said thyristor is selected to be a triac.

7. A circuit as defined in claim 6 for bidirectional current flow through said triac comprising a second series combination of a commutation electronic switch and an isolated dc voltage supply connected in parallel with said triac, said second commutation switch having a control input terminal, and both said second voltage supply and second commutation electronic switch being arranged with a polarity that permits current through said triac in a direction opposite said one direction to be bypassed through said second series combination, and permits reverse biasing said triac against conduction in the opposite direction, when said second commutation switch is caused to turn on in response to a command input signal, and second servo means for limiting the rate of rise of voltage across said second commutation switch as it is turned off in response to a command input signal applied to said second servo means, said second servo means being connected to receive said command input signal, and connected to a sensing point on said second series combination for sensing voltage across said second commutation switch.

8. A circuit as defined in claim 6 for bidirectional current flow through said triac, and switching means selectively coupling said series combination of said commutation electronic switch and said isolated dc voltage supply for bypass current of one direction when said triac is conducting in said one direction, and for bypassing current of opposite directions when said triac is conducting in said opposite direction.

9. A circuit as defined in claim 8 wherein said switching means is comprised of four switches in the form of a four sided bridge circuit having said series combination connected between two opposite nodes and said triac connected between the remaining two nodes, switches on two opposite sides arranged for conduction in one direction through said series combination, with one conducting switch at each end, and the other two switches arranged for conduction in opposite directions through said series combination, with one conducting switch at each end.

10. A circuit as defined in claim 9 wherein each of said four bridge switches is comprised of a thyristor.

11. A thyristor connected in series with a load and a source of electrical power to be applied through said load when said thyristor is switched on, means for switching said thyristor on, and commutation means connected in parallel with said thyristor for switching said thyristor off, said commutation means comprising a transistor and an isolated source of dc voltage connected in a series circuit, said series circuit being connected in parallel with said thyristor, said transistor having a control input terminal and an output terminal and said isolated dc voltage source being arranged with a polarity that permits thyristor current flowing in one direction to be bypassed through said transistor while said transistor is turned on, and at the same time permits reverse biasing said thyristor while said transistor is turned on, a bipolar source of constant current connected to said control input terminal of said transistor, said current source providing current of one polarity to turn said transistor on and of opposite polarity to turn said transistor off in response to a command input signal, and a capacitor connected between said transistor control input terminal and said transistor output terminal to control the rate of change of voltage across said transistor as it is turned on and as it is turned off.

12. A combination as defined in claim 11 wherein said thyristor is unidirectional.

13. A combination as defined in claim 11 wherein said thyristor is bidirectional, and including a second commutation means in parallel with the transistor and isolated source of dc voltage polarized for commutation of said thyristor while conducting in the opposite direction.

14. A combination as defined in claim 11 wherein said thyristor is bidirectional, and including a plurality of switches in a circuit for selectively changing the polarity of said commutation means.

15. A combination as defined in claim 11, 12, 13 or 14 in which said commutation transistor is comprised of a field-effect transistor.

16. A combination as defined in claim 15 wherein said field-effect transistor has internal capacitance and said capacitor is selected to have a value of capacitance so large relative to said internal capacitance of said field-effect transistor that the particular value of internal capacitance will not materially affect the rate of change of voltage across said field-effect transistor in turning on and off.

* * * * *